Patented Oct. 20, 1936

2,058,389

UNITED STATES PATENT OFFICE 2,058,389

SULPHONATED TERPENE PRODUCT AND METHOD OF PRODUCING

Alfred L. Rummelsburg, Wilmington, Del., assignor to Hercules Powder Company, Wilmington, Del., a corporation of Delaware No Drawing. Application May 1, 1935, Serial No. 19,175

12 Claims. (Cl. 260—99.12)

This invention relates to sulphonated terpene products and methods for their production, and more particularly to products formed by the sulphonation of mixtures of a polymerized terpene mixture, known as dipolymer, and a higher fatty acid or ester thereof, or aliphatic, aro-aliphatic, or aromatic compounds containing active groups such as —COOH, —COCl, —C—O, —CH—O, —Cl, —OH, —NH₂, —CONH₂, O—C—O—C=O, or aromatic hydrocarbons, or their substitution products.

In accordance with the present invention, it is found possible to sulphonate mixtures containing fatty acids or their esters such as castor oil, ricinoleic acid, olein, oleic acid, olive oil, linseed oil, corn oil, stearic acid, palmitic acid, a resin acid, such as abietic acid, etc., together with polymerized terpene mixtures such as light or dark dipolymer, or mixtures such as light or dark dipolymer with compounds such as butyl alcohol, or preferably an alcohol, desirably a monohydric alcohol, having more than 8 carbon atoms, as, for example, terpineol, borneol, fenchyl alcohol, abietyl alcohol, hydrogenated abietyl alcohol, lauryl alcohol, stearyl alcohol, cetyl alcohol, oleyl alcohol, etc.; or with amyl chlorides, benzyl chloride, naphthols, phenols, cresols, naphthylamines, aniline, acid amides, acid chlorides, phthalic anhydride, acetic anhydride, toluene, benzene, or naphthalene, or mixtures of dipolymer, fatty acids, and any of the above mentioned substances, using as a condensing and sulphonating agent chlorosulphonic acid, acetyl sulphuric acid, or fuming or concentrated sulphuric acid. Dipolymer, as the term is herein employed, is a product consisting of polymerized terpene hydrocarbons and is produced by the polymerization of dipentene, turpentine or pine oil, by various methods, for example, those outlined in the patents to Irvin W. Humphrey, 1,691,065, 1,691,067, 1,691,068 and 1,691,069 dated November 13, 1928. The term is herein used to broadly designate substances of this type. According to its method of production, the dipolymer is known as light or dark dipolymer.

As pointed out in U. S. Patent 1,993,415, granted March 5, 1935 to Rummelsburg and Little, it is found that dipolymer, or similar polymerized terpene mixtures, may be converted to water soluble products upon treatment with concentrated or fuming sulphuric acid, or chlorosulphonic acid, the product being capable of forming metallic salts. As pointed out in the above patent, both the product known as sulphonated dipolymer and its alkali salts are found to be very effective as wetting-out agents; that is, when added to water or various aqueous solutions they enable fibers, powders, or other substances, to be wetted more readily than would otherwise be the case. For example, they promote the speed and efficiency with which wool may be wetted and they also make possible the pasting of dye stuffs, powders, etc., which are sometimes very difficult to paste with water alone. These products are also effective emulsifying and dispersing agents.

It is also known that the various fatty esters and acids mentioned above can be sulphonated and used as wetting-out agents.

However, when the fat, fatty acid or other substances and polymerized terpenes are mixed together prior to sulphonation a different product is obtained from that made by mixing the sulphonated products after sulphonation of the two components separately, the unsaturated nature of the polymerized terpenes lending toward their ease of condensation with fats or substituted aliphatic, aromatic or araliphatic hydrocarbons, or the aromatic hydrocarbons themselves, a reaction similar to the Friedel and Crafts' reaction probably occurring in the case of aromatic anhydrides, or araliphatic halides in the presence of the sulphonating acid. Specifically the new products thus obtained are easier to make than sulphonated dipolymer, are more soluble in water and are more resistant to decomposition by acids. Both the free sulphonated acid products and their salts obtained by their neutralization are good emulsifying agents for pine oil, terpineol, hexalin, tetralin, stearol, etc. and other oils used in the textile industry and are very stable to acids such as sulphuric, hydrochloric and acetic acids and to salts such as magnesium chloride and common salt in concentrations up to 5%. Either the acid or its sodium salt is miscible with pine oil or terpineol in any proportion. For some purposes it is preferable to use the product in pine oil solution.

For example, a product obtained by treating a suitable mixture of oleic acid and polymerized terpenes with chlorosulphonic acid is more easily handled than a product obtained by sulphonating either oleic acid or dipolymer and, in addition, the vigorous nature of this reaction is greatly lowered because of a simultaneous condensation reaction which apparently occurs along with sulphonation. The products obtained will in general dissolve in water to give clear soapy solutions before being neutralized.

The product obtained when using oleic acid and a polymerized terpene mixture known as dark dipolymer is an oil containing about 3.0-6.5% sulphur and having an acid number of 80–110 and a saponification number of 150–200, and usually containing some water. The iodine value of the acid terpene mixture before sulphonation is about 135; after sulphonation about 40. The rhodanometric iodine number of the unsulphonated mixture is about 84; after sulphonation about 20.

*Example I*

As an example of a preparation in accordance with the invention, a mixture of 200 grams of technical oleic acid, acid number 189.2, saponification number 196.7, rhodanometric iodine number 85, and 200 grams of dark dipolymer, which is a mixture of terpenes containing varying percentages of higher polymers, is treated with 300 grams of technical chlorosulphonic acid by adding the latter gradually for three-quarters of an hour to the mixture held at 25–30° C. while stirring vigorously and cooling. After addition of the acid the temperature is raised to 70° C. with continued agitation for several hours until evolution of hydrogen chloride ceases. The mixture is then cooled and 700 cc. of saturated common salt solution is added while cooling and stirring. After standing for two to four days the lower layer of sodium chloride solution is separated thus washing the oil. One or two additional washes with concentrated sodium chloride solution may be given. The yield of sulphonated oil, on a dry basis, so obtained amounts to 400 to 600 grams and has the properties indicated above.

The washed oil may be then neutralized with a suitable base or alkaline solution, for example, pyridine, triethanolamine, or a 30% caustic soda solution, although solutions of sodium or potassium carbonate or ammonia may be used. This neutralizing agent is dropped in slowly with stirring and, usually, cooling until the oil becomes neutral. After such treatment, the oil contains 10 to 40% of water.

In the practice of the above process the proportions and quantities of substances used may vary widely as may the conditions under which the reaction takes place. For example, the ratio of fatty acid to polymerized terpene mixture may vary from 5 to 0.5 depending upon the nature of the polymerized mixture used. The quantity of chlorosulphonic acid may vary from 0.2 to 5 times the weight of the reactant mixture. Further, the temperature may vary from 10° to 150° C. during the reaction depending upon the difficulty of condensation and sulphonation. An inert solvent medium such as diethyl ether, mineral naphtha, or hexane, may be used for the reaction. When a fatty acid ester, for example, a glyceride, is used rather than a fatty acid the reaction is somewhat slower. Esters in general give products similar to their corresponding fatty acids.

*Example II*

As another example of the practice of the invention, there is added slowly to 480 grams of 105% sulphuric acid a mixture of 91 grams of technical oleic acid and 76 grams of a polymerized terpene mixture as before with vigorous stirring and cooling taking about three-quarters of an hour while the temperature is kept at 20 to 30° C. When the temperature is raised to 75 to 100° C. for one hour, or until complete sulphonation takes place after which the temperature is lowered and water is dropped in slowly with cooling to form a 40–50% solution of acid. The viscous sulphonated oil which separates on standing is washed with a common salt solution or can be separated while containing a small amount of acid impurity and dissolved in 600 cc. of water, then neutralized with a suitable alkaline solution. Sufficient common salt is then added to form 15% salt solution and the neutral sulphonated product separates as an oil containing 20 to 40% of water and weighing 120 grams on a dry basis. In this example the ratio of constituents may be varied as before. Also the acid may be added to the reactant mixture rather than the mixture to the acid. considerable variations of temperatures may also be used.

*Example III*

As a further example a mixture consisting of 100 g. dark dipolymer and 100 g. of oleic acid is added slowly with cooling and agitation to 500 g. concentrated $H_2SO_4$ (95%). The mixture is agitated at room temperature for 12 hours, after which it is diluted to 50% acid strength, the sulphonated product separated and washed with brine, and then neutralized giving about 220 g. water-soluble product containing about 3.0% sulphur and having distinct wetting and emulsifying properties. The acid may be added to the mixture instead of the mixture to the acid with similar results.

The oleic acid in the foregoing examples may be replaced with castor oil; by carrying out the reactions in duplicate to the foregoing treatment a water soluble oil is obtained having an A. N. of about 95 and a saponification number of about 150 before neutralization.

Abietic acid or esters thereof, such as ethyl or glyceryl abietate may be substitutes for oleic acid for the production of similar product.

*Example IV*

As a further example, a mixture containing 200 g. of linseed oil fatty acids (acid number of 197 and iodine number of 182) and 160 g. dark dipolymer is treated with 300 g. of a mixture previously prepared by adding 150 g. concentrated sulphuric acid to 150 g. of acetic anhydride slowly at 15° C. The acetyl sulphuric acid mixture is added to the fatty mixture slowly at 15° C. with vigorous agitation. Afterward the mixture is agitated for several hours at 15° C. The reaction can be completed if desired by heating to 100° C. for several hours. In this reaction, as in others in accordance with this invention, heating is optional after adding the sulphonating acid. After cooling, the mixture is added to one liter of 10% sodium chloride solution with agitation, and the sulphonated oil allowed to separate; a second wash may be necessary. The oil is allowed to stand over the salt solution for several days before separating. The resultant product dissolves readily in water to give opalescent and sometimes opaque solutions. When neutralized as in the above example it dissolves in water at any concentration to give clear solutions. The unneutralized product has an acid number of about 120 and a saponification number of about 200, with a sulphur content of about 3%. Linseed oil may be substituted for the fatty acids. The sulphur content may be increased or decreased accordingly as the amount of sulphonating agent is increased or decreased. The temperature during the operation may vary widely as before according to the type of product desired, and the amount of polymerized terpene constituents present.

Example V

As a further example, a mixture containing 100 g. dark dipolymer and 60 g. lauryl alcohol is slowly treated with 150 g. chlorosulphonic acid or other sulphonating acid, as fuming sulphuric, at a temperature of 20–30° C. with vigorous agitation and cooling. After an hour when the acid is added, the temperature is raised to 60–100° C. for several hours with continued agitation. It is then cooled, and washed with 500 cc. 15% salt solution giving about 200 g. product. The washed product is water soluble and possesses powerful emulsifying, dispersing and wetting properties, both before and after neutralization. An alcohol of lower molecular weight than lauryl alcohol can be used although the desired effect is somewhat proportional to the length of the alcohol carbon chain.

In all the above examples the effect of elevated temperature is to increase the rate of reaction. The same results may be obtained using room temperatures, however, much longer periods of agitation are required. The proportion of components used may be varied depending upon the nature of the polymerized terpene mixture. In many of the cases chlorosulphonic may be used as well as concentrated or fuming sulphuric acid.

While the specific examples relating to the use of fatty acids pointed out above relate to the treatment of oleic acid, castor oil and linseed oil fatty acids together with polymerized terpenes, other higher fatty acids, or their glycerides, or higher fatty acid esters may be similarly treated, the products obtained with fatty acids being particularly important. However, while the treatment is similar it may be necessary to vary the temperature, proportions of reactants, sulphonating acid, etc. The products obtained will not always possess the same properties, although they will be of the same general type. In general, the products have the emulsifying and wetting out properties indicated above, the calcium, magnesium and similar salts being sufficiently soluble in water and the free acid or neutral product is soluble in dilute acids, such as sulphuric, hydrochloric, acetic, etc., so that the sulphonated derivatives may be used in acidic solutions or hard water.

In certain cases it is found practical to prepare the alkali salts of the sulphonated derivatives by treating the free sulphonic acids with calcium carbonate, filtering, and then treating the solution with alkali carbonate until it is slightly alkaline to litmus and again filtering. An alkali salt of a sulphonic derivative may then be obtained by evaporation. Instead of using the mixed polymerized terpenes the pure diterpene or higher polymers may be employed. The dipolymer may be obtained as pointed out above by heat treatment of pinene, dipentene, etc., or with heat treatment in connection with a polymerizing catalyst, such as fuller's earth, stannic chloride, or the like. The dipentene may be obtained by first dehydrating either terpineol or pine oil and then polymerizing the terpenes. The dipolymer as obtained for sulphonation may contain a considerable proportion of pine oil components.

I have not herein claimed my invention broadly as it relates to the sulphonation of mixtures of a polymerized terpene and an organic compound capable of sulphonation, nor specifically with reference to the sulphonation of mixtures of a polymerized terpene and those organic compounds herein disclosed other than alcohols, since such forms the subject matter of and is claimed in my copending application, Serial No. 614,281, filed May 28, 1932, of which this application constitutes a continuation in part.

What I claim and desire to protect by Letters Patent is:

1. The process of preparing a sulphonated product which includes treating a mixture of a polymerized terpene and an alcohol having more than 8 carbon atoms with a sulphonating agent capable of causing condensation between the polymerized terpene and the alcohol.

2. The process of preparing a sulphonated product which includes treating a mixture of a polymerized terpene and a monohydric alcohol having more than 8 carbon atoms with a sulphonating agent capable of causing condensation between the polymerized terpene and the alcohol.

3. The process of preparing a sulphonated product which includes treating a mixture of a polymerized terpene and an alcohol having more than 8 carbon atoms with concentrated sulphuric acid.

4. The process of preparing a sulphnoated product which includes treating a mixture of a polymerized terpene and an alcohol having more than 8 carbon atoms with chlorosulphonic acid.

5. The process of preparing a sulphonated product which includes treating a mixture of a polymerized terpene and an alcohol having more than 8 carbon atoms with acetyl sulphuric acid.

6. The process of preparing a sulphonated product which includes treating a mixture of a polymerized terpene and a monohydric alcohol having more than 8 carbon atoms with a sulphonating agent capable of causing condensation between the polymerized terpene and the alcohol and neutralizing the reaction product.

7. The process of preparing a sulphonated product which includes treating a mixture of a polymerized terpene and a monohydric alcohol having more than 8 carbon atoms with a sulphonating agent capable of causing condensation between the polymerized terpene and the alcohol and treating the sulphonated product with an alkali.

8. The product of a simultaneous condensation and sulphonation of a polymerized terpene and an alcohol having more than eight carbon atoms, said product being formed by the treatment of a mixture of said compounds with a sulphonating agent capable of causing condensation between the polymerized terpene and the alcohol.

9. The product of a simultaneous condensation and sulphonation of a polymerized terpene and a monohydric alcohol having more than eight carbon atoms, said product being formed by the treatment of a mixture of said compounds with a sulphonating agent capable of causing condensation between the polymerized terpene and the alcohol.

10. The product of a simultaneous condensation and sulphonation of a polymerized terpene and a terpenic alcohol, said product being formed by the treatment of a mixture of said compounds with a sulphonating agent capable of causing condensation between the polymerized terpene and the alcohol.

11. The product of a simultaneous condensation and sulphonation of a polymerized terpene and lauryl alcohol, said product being formed by the treatment of a mixture of said compounds with a sulphonating agent capable of causing condensation between the polymerized terpene and the alcohol.

12. The neutralized product of a simultaneous condensation and sulphonation of a polymerized terpene and an alcohol having more than eight carbon atoms, said product being formed by the treatment of a mixture of said compounds with a sulphonating agent capable of causing condensation between the polymerized terpene and the alcohol, and neutralization of the product so formed.

ALFRED L. RUMMELSBURG.